US012319055B2

(12) United States Patent
Ouassif et al.

(10) Patent No.: US 12,319,055 B2
(45) Date of Patent: Jun. 3, 2025

(54) INK JET HEAD FOR EMISSION OF CERAMIC ENAMEL

(71) Applicant: SYSTEM CERAMICS S.P.A., Fiorano Modenese (IT)

(72) Inventors: Mohamed Ouassif, Sassuolo (IT); Franco Stefani, Sassuolo (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 107 days.

(21) Appl. No.: 18/249,565

(22) PCT Filed: Nov. 22, 2021

(86) PCT No.: PCT/IB2021/060815
§ 371 (c)(1),
(2) Date: Apr. 19, 2023

(87) PCT Pub. No.: WO2022/130070
PCT Pub. Date: Jun. 23, 2022

(65) Prior Publication Data

US 2023/0382103 A1 Nov. 30, 2023

(30) Foreign Application Priority Data

Dec. 18, 2020 (IT) ........................ 102020000031547

(51) Int. Cl.
*B41J 2/04* (2006.01)
*B41J 2/14* (2006.01)

(52) U.S. Cl.
CPC ............ *B41J 2/04* (2013.01); *B41J 2002/041* (2013.01); *B41J 2/14* (2013.01); *B41J 2202/05* (2013.01); *B41J 2202/12* (2013.01)

(58) Field of Classification Search
CPC .... B41J 2/04; B41J 2002/041; B41J 2202/12; B41J 2/14; B41J 2202/05
See application file for complete search history.

(56) References Cited

U.S. PATENT DOCUMENTS 4,723,131 A 2/1988 Droit
2019/0283417 A1* 9/2019 Stefani .................. B41J 2/1433

OTHER PUBLICATIONS

Italian Patent Application No. 102015000031664, filed Jul. 8, 2015, inventors Franco Stefani and Mohamed Ouassif, English abstract attached, 9 pages.
Italian Patent Application No. 102015000031675, filed Jul. 8, 2015, inventors Franco Stefani and Mohamed Ouassif, English abstract attached, 10 pages.

* cited by examiner

*Primary Examiner* — Henok D Legesse
(74) *Attorney, Agent, or Firm* — Chrisman Gallo Tochtrop LLC

(57) ABSTRACT

An ink jet head, comprising:
- a dispensing unit (2), provided with: a main circulation conduit (21) for circulating a ceramic enamel; two or more nozzles (3), placed in communication with the main conduit (21) and distributed along a main direction (X); at least one shutter (4), activatable to close or free said nozzles (3);
- at least one actuator (5), arranged to activate the shutter (4);
- wherein the shutter (4) is movable between at least one closing configuration,
- in which it is capable of closing all the nozzles (3), and at least one opening configuration, in which it frees at least one nozzle (3) to allow the emission of ceramic enamel.

7 Claims, 4 Drawing Sheets

Fig.5
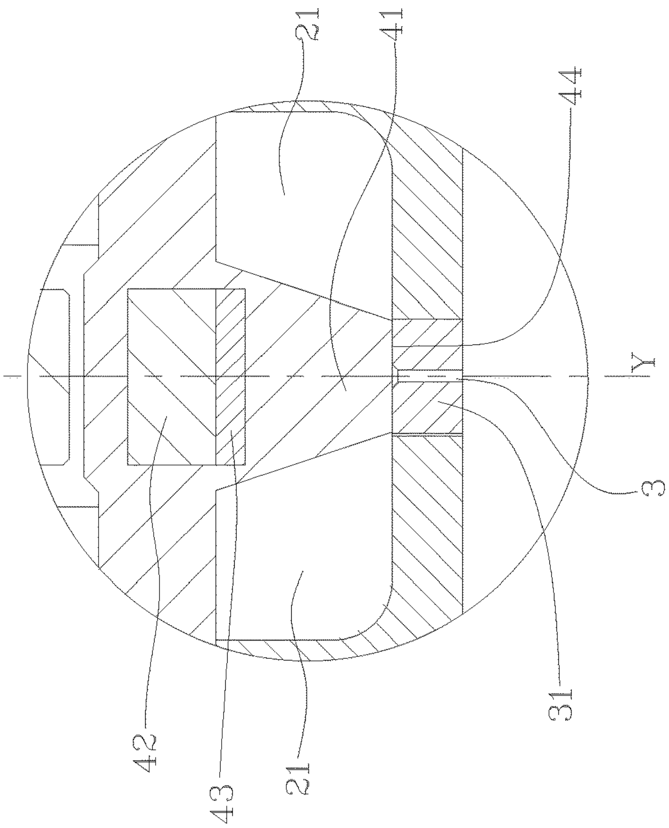
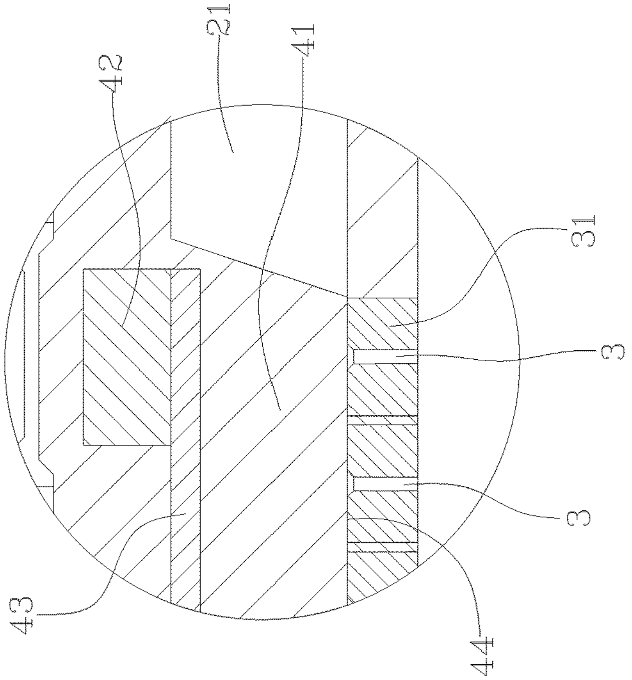
Fig.4

INK JET HEAD FOR EMISSION OF CERAMIC ENAMEL

The present invention relates to an ink jet head for enamelling.

In particular, the head according to the present invention is advantageously configured to spread a uniform layer of ceramic enamel on a ceramic tile.

The most recent processes for the production of ceramic tiles include, in summary, the following operations.

The tiles are initially formed by pressing, starting from a soft layer of granular ceramic material. After the pressing, the tiles are subjected to an enamelling step, the purpose of which is to apply a uniform layer of ceramic enamel on the exposed surface of the tiles. Such a uniform layer of ceramic enamel, of a predetermined colour, is essentially the background for the subsequent application of a decoration, which defines the colour effect and the final appearance of each tile. After the decoration is applied, the tiles undergo a firing process which permanently fixes the shape and decoration thereof.

In output from the press and between the enamelling and decoration application steps, any drying steps can be included, which are useful but not however necessary.

As already mentioned, the enamelling step includes the application of a uniform layer of ceramic enamel on the exposed surface of the tiles.

Currently, the enamelling step is carried out by means of pneumatic dispensers, which, from above, spray the enamel in the direction of the underlying tiles. Typically, the pneumatic dispensers comprise a plurality of pneumatic nozzles, associated with moving structures through which they move along predetermined trajectories which are configured so that the nozzles, as a whole, sweep the entire exposed surface of the tiles, so that the latter is completely covered with enamel. The pneumatic dispensers are generally contained inside closed booths, through which the tiles pass continuously, by means of conveyor planes with rollers or belts.

The current pneumatic dispensers have numerous drawbacks.

Firstly, the pneumatic dispensing of the enamel implies a considerable waste thereof. In fact, a consistent fog is created inside the booths which, for the most part, is dispersed without reaching the tiles, and must be recovered and recycled or disposed of.

Furthermore, the pneumatic dispensing of the enamel allows to apply a layer of enamel of extremely limited thickness on the tiles. This is because the flow rate of pneumatically dispensable enamel must necessarily be very limited, to avoid the formation of droplets which would compromise the uniformity of the applied layer. Being thin, the applied enamel layer inevitably has unevenness in the form of streaks, which essentially follow the trajectories followed by the dispensing nozzles. To limit this last drawback, it is necessary to arrange a certain number of consecutive pneumatic dispensers, each arranged to apply its own layer of enamel on the tiles which overlaps the layers applied by the previous dispensers. This naturally leads to an increase in the size of the enamelling booths and a considerable increase in the dispersed enamel.

The object of the present invention is to offer a tool which allows to greatly improve the tile enamelling step, allowing the application of a consistent and uniform layer of enamel, minimising the waste of enamel and the time required for the application of the enamel.

In particular, the invention radically changes the principle of enamel application with respect to the current technique. In fact, the invention allows to apply a consistent and uniform layer of enamel, not by means of pneumatic dispensers, but by means of an ink jet head, advantageously configured for such a purpose.

Additional features and advantages of the present invention will become more apparent from the following detailed description of an embodiment of the invention, illustrated by way of non-limiting example in the appended figures, in which:

FIG. 4 shows a zone of FIG. 2 enlarged;

FIG. 5 shows a zone of FIG. 3 enlarged.

Figure 1:
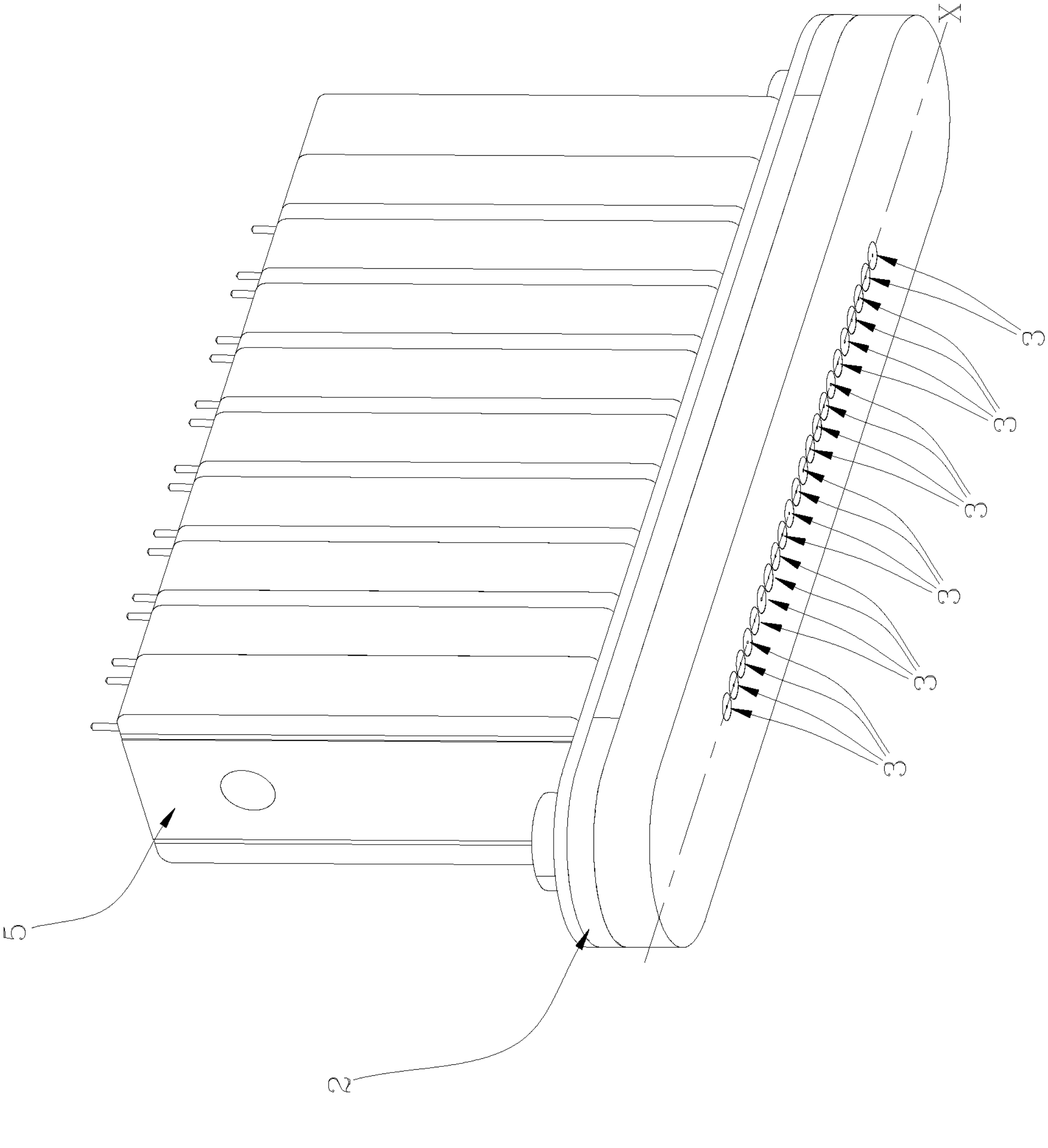
FIG. 1 shows an axonometric view of a head according to the present invention.

The ink jet head according to the present invention comprises a dispensing unit (2), associated with an actuator (5).

The dispensing unit (2) comprises a main circulation conduit (21) for circulating a ceramic enamel. In a known manner, the main conduit (21) has an inlet opening (21*a*) and an outlet opening (21*b*) connected to an enamel circulation circuit, not shown in detail, whose function is to keep the enamel itself constantly moving, to avoid the formation of sediments.

The dispensing unit (2) comprises two or more nozzles (3), placed in communication with the main conduit (21) and preferably distributed along a main direction (X). In conditions of normal use of the head, the main direction (X) is substantially horizontal. The term "nozzle" will generally refer to a shaped hole, intended to allow the dispensing of a certain amount of ceramic enamel. The shaped hole is preferably of circular cylindrical shape, concentric to a central axis which substantially identifies the dispensing direction of the ceramic enamel. Each nozzle (3) has an inlet opening, arranged at a first end of the nozzle (3) and facing the main channel (21), i.e., placed in communication with the main channel (21), and an outlet opening, placed at the opposite end of the nozzle (3) and facing outwards.

In the embodiment depicted, the central axis of the nozzles is substantially perpendicular to the main direction (X) and, in conditions of normal use of the head, is oriented substantially vertically.

In conditions of normal use of the head, i.e., for dispensing the enamel, the main channel (21) is maintained at a pressure greater than atmospheric pressure. In other words, the enamel circulation circuit, to which the main channel (21) is connected, is at a pressure greater than atmospheric pressure.

In the embodiment depicted, the nozzles (3) are aligned along the main direction (X) in a single row. In other embodiments, not shown, the nozzles (3) could be arranged in several rows parallel to the main direction (X), or in another manner. In general, the nozzles (3) are arranged so as to define a printing front (S), understood as the width, measured parallel to the main direction (X), of a surface on which the enamel dispensed by the nozzles (3) can be deposited. In other words, printing front means the overall width of the orthogonal projections of the nozzles (3) on a horizontal plane, or on a plane parallel to the plane intended to receive the dispensed ceramic enamel. The plane intended to receive the ceramic enamel is, typically, the surface of a ceramic plate, laying on a horizontal plane.

The dispensing unit (2) further comprises at least one shutter (4), activatable to close or free said nozzles (3). The actuator (5) is arranged to activate the shutter (4).

Unlike the current ink jet heads, the shutter (4) is suitable for simultaneously closing all the nozzles (3) in at least one closing configuration. In other words, the shutter (4) is configured so as to be able to simultaneously close all the nozzles (3) in a closing configuration. In essence, the shutter (4) is movable between such a closing configuration, in which it is capable of closing all the nozzles (3), and at least one opening configuration, in which it frees at least one nozzle (3) to allow the emission of ceramic enamel.

By freeing at least one nozzle (3) it is intended that the shutter (4) deviates and frees the inlet opening of the nozzle (3), i.e., the opening of the nozzle (3) facing the main channel (21). In such conditions, the enamel present in the main channel (21) is free to flow through the nozzle (3), in particular if the main channel (21) is maintained at a pressure greater than atmospheric pressure.

The idea of creating and using a shutter (4) suitable for simultaneously closing all the nozzles (3) avoids the need to prepare a single shutter for each nozzle (3), and therefore allows the nozzles (3) to be very close together, so as to cover a substantially uniform printing front. In other words, the nozzles (3) are separated by pitches whose length, measured along the main direction (X), is such as to allow an overlap of the enamel flows dispensed on the printing front through the nozzles (3), so that the enamel dispensed by the nozzles (3) uniformly covers the entire printing front. This allows the head according to the present invention to be used to spread a uniform layer of enamel on a surface underlying the nozzles (3).

The head according to the present invention can be used in a digital decorator, employed for the decoration of ceramic tiles. In essence, the head according to the present invention can replace the decorating heads currently used for decoration, which are however not suitable for enamelling ceramic tiles, or for dispensing a uniform layer of ceramic enamel. This is because the decorating heads are designed to create very defined and complex decorations, which require a very precise dispensing of the enamel. To this end, the dispensing nozzles each require their own dedicated shutter, and can thus not be approached to the point of being able to spread a uniform layer of enamel, as required for a correct enamelling.

As is known in the sector, a digital decorator comprises a transport plane, movable along an advancement direction, on which the plates or tiles to be decorated are placed in succession. The transport plane leads the tiles to the printing unit, i.e., to the actual printing device which comprises a plurality of decorating heads, placed above the transport plane with their nozzles facing downwards. The decorating heads can be distributed in various manners. For example, the decorating heads can be distributed in parallel rows, aligned along directions perpendicular to the advancement direction.

The decorating heads can be offset therebetween, so as to cover a sufficient printing front to dispense the enamel in all the zones of the underlying plates.

In a digital decorator of the synthesised type, the heads according to the present invention can substantially replace the decorating heads. The control of the actuator (5), by means of a control module or computer known in the sector, allows to activate or deactivate the dispensing of enamel through the nozzles (3) when a tile or plate passes below the head, in a completely similar manner to what occurs in a digital decorator.

In the illustrated, preferred but not exclusive embodiment, the shutter (4) comprises a main body (41), made of elastomeric material, and at least one side portion (**41*s*), at which it is associated with the main conduit (21**).

Elastomeric material means a material capable of elastically deforming, even locally or in areas of limited volume, such as a rubbery or silicone material. In other words, elastomeric material means a material capable of deforming if subjected to a mechanical action or crushing and returning to its original form once it is no longer subjected to a mechanical action.

The main body (41) faces the nozzles (3) and is intended to be arranged in contact therewith in the closing position of the shutter (4), to prevent the dispensing of the enamel. In this embodiment, the main body (41) is movable between the aforementioned opening and closing positions. In other words, with reference to the embodiment depicted, reference can now be made to opening or closing positions of the shutter (4), meaning opening or closing positions of the main body (41).

Two or more magnetic elements (42), spaced apart, are associated with the main body (41). Magnetic element (42) is intended as an object which comprises a permanent magnet, or consists of a permanent magnet, or is otherwise susceptible to interaction with a magnetic field, to be moved by the latter along at least one direction.

In the depicted embodiment, the actuator (5) comprises two or more solenoids (51), each of which is active on a respective magnetic element (42). In particular, the actuator (5) and the shutter (4) are positioned relative to each other so that each magnetic element (42) is positioned in a substantially concentric position with the respective solenoid. In a known manner, through an activation of each solenoid (51) it is possible to attract or repel the magnetic element (42) facing that solenoid (51). A particularly advantageous embodiment for the actuator (5) is described in Italian patent applications 102015000031664 and 102015000031675, the description of which is intended to be incorporated in the present description.

By simultaneously activating the solenoids (51), it is possible to simultaneously move the magnetic elements (42), and thus move the main body (41) between the opening and closing positions.

In the illustrated embodiment, the shutter (4) comprises a plurality of magnetic elements (42), arranged aligned along the main direction (X). The actuator (5) comprises a corresponding number of solenoids (51), each of which is aligned with a respective magnetic element (42), along a direction perpendicular to the main direction (X). In particular, each solenoid (51) has a longitudinal axis (Y), with respect to which the corresponding magnetic element (42) is concentric.

The magnetic elements (42) are solidly constrained to the main body (41). The simultaneous activation of the solenoids (51) allows to simultaneously translate the magnetic elements (41) away from or towards the solenoids (51), and thus to translate the main body (41) in accordance with the magnetic elements (42). In this case, the main body (41) moves substantially rigidly, obtaining the simultaneous opening or closing of all the nozzles (3).

Preferably, the magnetic elements (42) are aligned parallel to the main direction (X) and are separated by regular pitches, i.e., they are separated from each other by constant distances along the main direction (X).

In the embodiment of the head in which the main body (41) is made of elastomeric material, a non-uniform translation of the main body (41) itself is also allowed. In particular, the main body (41) is deformable between said closing configuration, in which it closes all the nozzles (3), and at least one partial opening configuration, in which one portion of the main body (41) closes one part of the nozzles (3) and another portion of the shutter (4) frees another part of the nozzles (3). In other words, being made of elastomeric material, the main body (41) can assume one or more deformed configurations, at which it can open some nozzles (3) and close other nozzles (3).

In the preferred embodiment of the head, in which the actuator (5) comprises the solenoids (51), the non-uniform translation of the main body (41), i.e., the deformation of the main body (41) described above, can be achieved by means of a non-concurrent and/or non-uniform activation of the solenoids (51). In essence, by activating only a part of the solenoids (51) it is possible to translate the corresponding magnets (42) and produce the displacement of the corresponding part of the main body (41).

The possibility of partializing the opening/closing of the nozzles (3) is very useful if the head, and in particular the dispensing unit (2), is positioned astride the side edge of the surface to be enameled. In this case, part of the nozzles are located outside the surface to be enameled. The enamel dispensed by such nozzles would therefore be substantially dispersed, and should be recovered or disposed of. Thanks to the head according to the present invention, and in particular to the creation of the main body (41) of the shutter (4) in elastomeric material, it is possible to close the nozzles (3) which are located outside the surface to be decorated, and open those which are located inside the surface to be decorated. This allows to limit or cancel the dispensing of enamel outside the surface to be enameled.

Preferably, but not necessarily, the head comprises a ferromagnetic element (43), placed in contact with said two or more magnetic elements (42). The ferromagnetic element (43) allows to significantly increase the force which the solenoids (51) can exert on each magnetic element (42), with the same supply current. A greater force exerted on each magnetic element (42) allows to improve the control of the main body (41). For example, in the closing position, the main body (41) can be pressed with greater force in contact with the nozzles (3), achieving a better closure. Furthermore, the application of greater force to the magnetic elements (42) facilitates the differentiated displacement of the main body (41), i.e., facilitates the deformation of the main body (41) in order to open or close only some nozzles (3) with respect to other nozzles (3). Another advantage given by the use of the ferromagnetic element (43) is that it facilitates the frequency activation of the magnetic elements (42), i.e., it allows to produce the dispensing of enamel through the nozzles (3) not through the stable positioning of the main body (41) in the opening position, but through a cyclic movement between the opening position and the closing position, with a certain frequency, established through the frequency activation of the solenoids (51).

In the depicted embodiment, the ferromagnetic element (43) is in the form of a relatively thin plate, arranged in contact with the magnetic elements (42). The thickness of the ferromagnetic element (43) can be chosen in relation to the control intended to be carried out of the displacement of the main body (41). If it is intended to perform a rigid control of the main body (41), i.e., to move the main body (41) as a rigid body, to achieve the simultaneous closing or opening of the nozzles (3) and/or to facilitate a frequency control, it is preferable to use a ferromagnetic element (43) of greater thickness. If it is intended to carry out a differentiated control of the main body (41), i.e., a control which includes the possibility of deforming the main body (41) to achieve the closing/opening of some nozzles (3) with respect to others, it is preferable to use a ferromagnetic element of lower thickness and greater flexibility.

In the illustrated, preferred but not exclusive embodiment, the magnetic elements (42) and the ferromagnetic element (43) are contained inside the main body (41). In particular, the magnetic elements (42) and the ferromagnetic element (43) are incorporated inside the main body (41). Such a configuration is particularly advantageous when the main body (41) is made of elastomeric material, as it greatly improves the control accuracy of the movements of the main body (41).

In the depicted, preferred but not exclusive embodiment, the dispensing unit (2) comprises a casing (22) which delimits, therein, the main conduit (21). The outlet inlet openings (21*a*, 21*b*) of the main conduit (21) are located in respective fittings, solidly constrained to the casing (22). The nozzles (3) are placed on a lower wall of the casing (22), in order to connect the main conduit (21) with the outside. Preferably, the nozzles (3) are obtained through a plate (31) associated with the lower wall of the casing (22). Such a plate (31), and therefore also the surfaces which delimit the nozzles (3), is made of elastomeric material. The use of an elastomeric material, very resistant to the abrasive action exerted by the ceramic enamels, allows to increase the duration of the nozzles (3), which maintain their initial shape for a much longer period than the common nozzles made of hard materials. Furthermore, the use of an elastomeric material, and therefore elastically deformable, limits the clogging of the nozzles (3). This is because, being able to deform elastically, the nozzles (3) are capable of allowing the expulsion of any occlusions.

Figure 2:
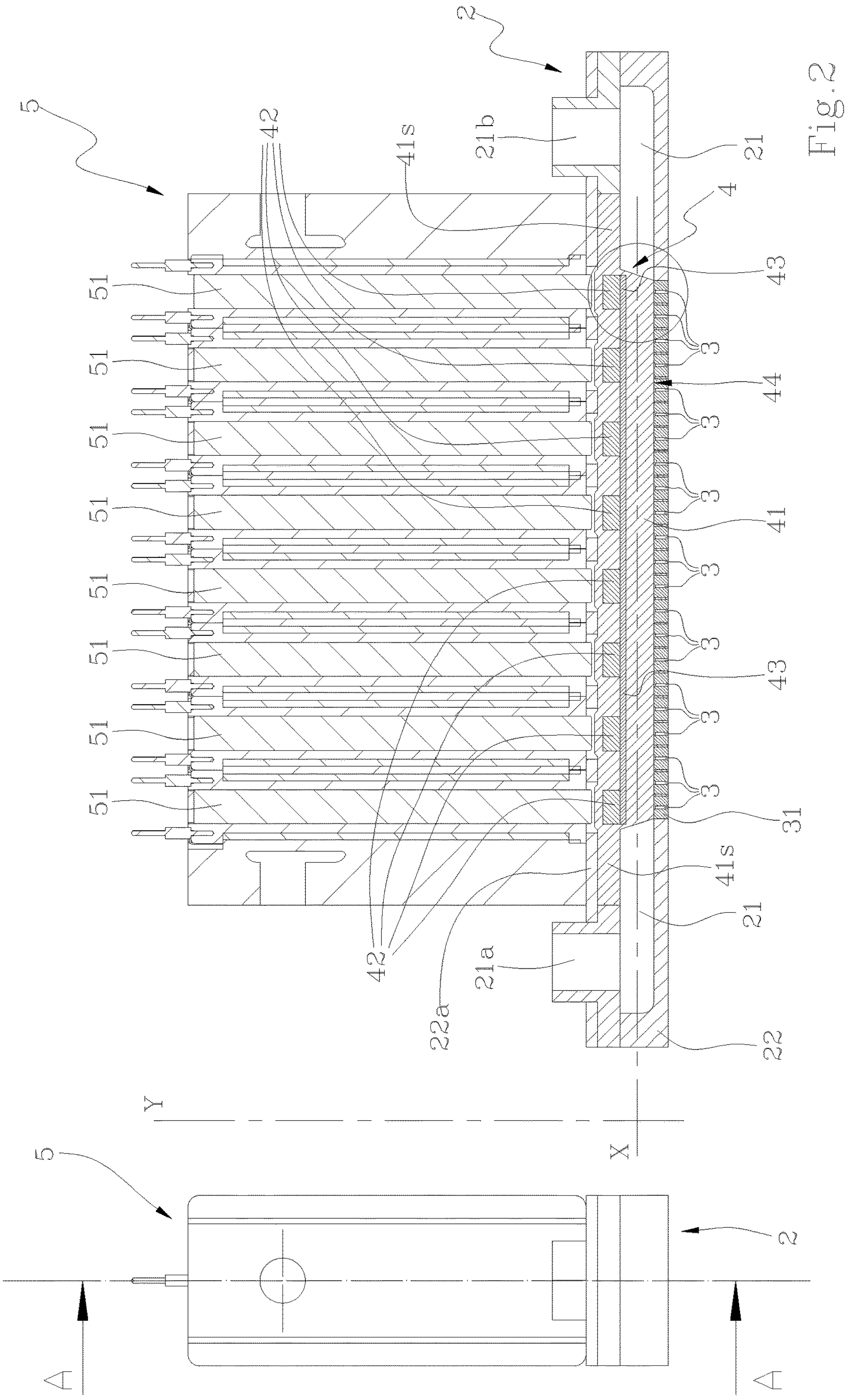
FIG. 2 shows a sectional view of the head of FIG. 1, according to the plane of trace A-A.
Figure 3:
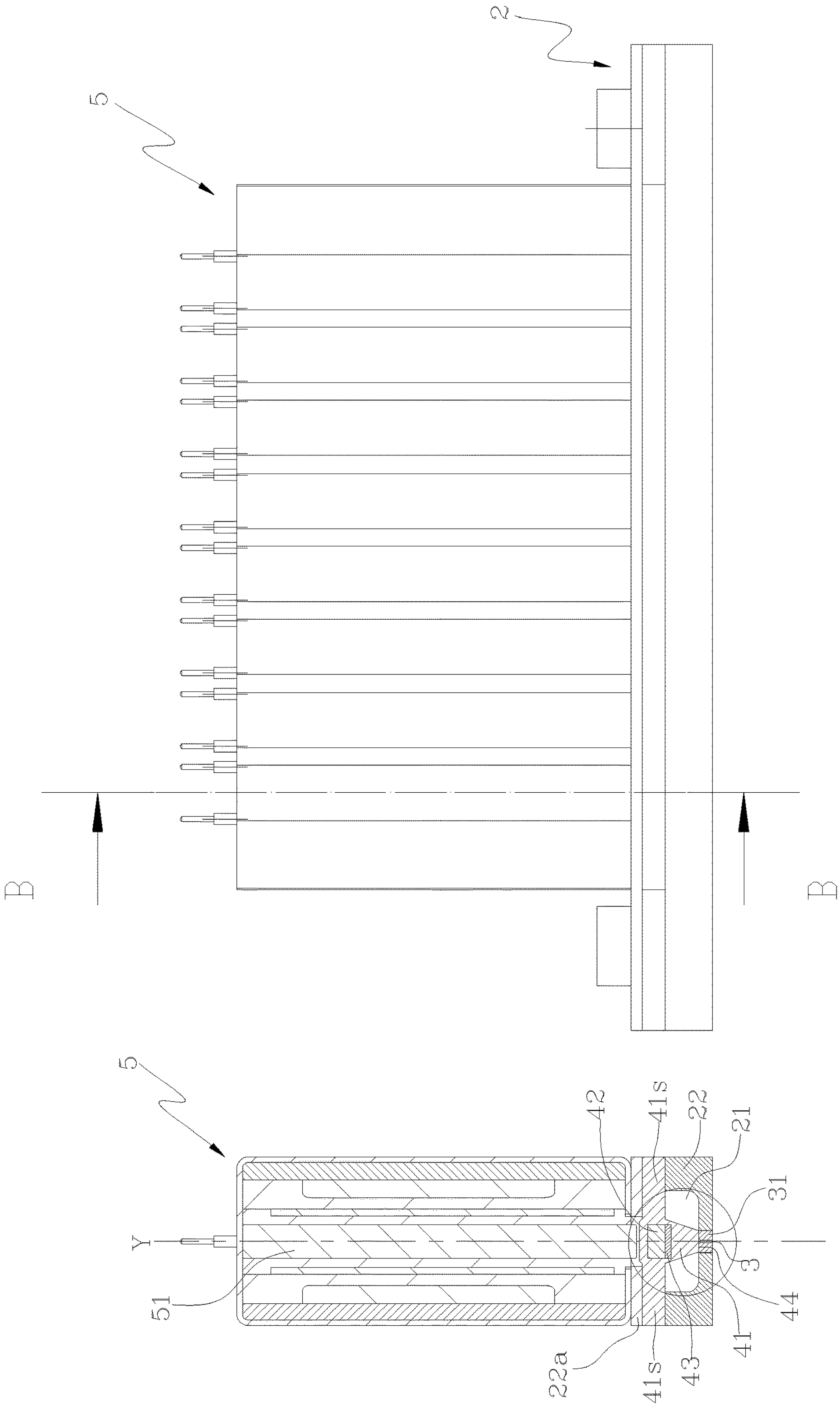
FIG. 3 shows a sectional view of the head of FIG. 1, according to the plane of trace B-B.

On a side opposite the nozzles (3), the main conduit (21) is closed, at least partially, by the shutter (4). As can be seen in FIG. 2, the shutter (4) is associated with the casing (22) at two side portions (41*s*), connected to the main body (41). The latter protrudes inside the main channel (21) towards the nozzles (3). Preferably, the main body (41) has a tapered shape in the direction of the nozzles (3). The main body (41) also has a substantially flat front surface (44), which is intended to be positioned in contact with the nozzles (3) in the closing position of the shutter (4).

The dispensing unit, except for the inlet (21*a*) and outlet (21*b*) openings and the nozzles (3), is isolated with respect to the outside.

The actuator (5) is associated with the casing (22) on the opposite side with respect to the nozzles (3). The actuator (5), preferably made in a single body, as described in Italian patent applications 102015000031664 and 102015000031675, the description of which is intended to be incorporated in the present description. The actuator (5) is associated with an upper cover (22*a*) of the casing (22). Said upper cover (22*a*) has a plurality of openings, each of which is aligned and/or concentric with a respective magnetic element (42). Furthermore, the openings of the upper cover (22*a*) are positioned so as to align with the longitudinal axes (Y) of the various solenoids (51). In particular, the actuator (5) is positioned so that the ferromagnetic core of each solenoid (51) faces a respective opening of the upper cover (22*a*), to reduce the distance with respect to the corresponding magnetic element (42). Furthermore, the longitudinal axes (Y) of the solenoids (51) and the main direction (X) lie on the same plane. The emission directions of the nozzles (3) are substantially parallel to such a plane.

Advantageously, the actuator (5) is removably associated with the dispensing unit (2), to allow the replacement of the dispensing unit (2) with another dispensing unit (2). Since both the dispensing unit (2) and the actuator (5) are built in a single block, it is possible to use coupling means, within the reach of the technician in the sector, to removably constrain one to the other. The replacement of the dispensing unit (2) allows, for example, to use a dispensing unit (2) with a different number of nozzles (3) and/or with nozzles of different sizes and/or different distribution, or simply to replace a dispensing unit (2) with another similar one in case of maintenance or malfunction.

The invention claimed is:

1. An ink jet head, comprising:

a dispensing unit (2), provided with: a main circulation conduit (21) for circulating a ceramic enamel;

two or more nozzles (3), placed in communication with the main conduit (21) and distributed along a main direction (X);

a shutter (4), activatable to close or free said nozzles (3);

an actuator (5), arranged to activate the shutter (4);

wherein the shutter (4) is movable between at least one closing configuration, in which it is capable of closing all the nozzles (3), and at least one opening configuration, in which it frees at least one nozzle (3) to allow the emission of ceramic enamel;

wherein the shutter (4) comprises a main body (41), made of elastomeric material, to which two or more magnetic elements (42) are associated, mutually spaced apart and wherein the actuator (5) comprises two or more solenoids (51), each of which is active on a respective magnetic element (42); and a ferromagnetic element (43), placed in contact with said two or more magnetic elements (42).

2. The head according to claim 1, wherein the magnetic elements (42) and the ferromagnetic element (43) are contained inside the main body (41).

3. The head according to claim 1, wherein the shutter (4) is deformable between said closing configuration and at least one partial opening configuration, in which one portion of the shutter (4) closes some of the nozzles (3) and another portion of the shutter (4) frees other nozzles (3).

4. The head according to claim 1, wherein the dispensing unit (2) comprises a casing (22) which delimits, inside it, the main conduit (21), and wherein the main conduit (21) is closed, at least partially, by the shutter (4) which is associated with the casing (22).

5. The head according to claim 1, wherein the nozzles (3) are placed on a lower wall of the casing (22), so as to put the main conduit (21) in communication with the outside, and are obtained through a plate (31) associated with the lower wall of the casing (22).

6. The head according to claim 5, wherein the plate (31) is made of elastomeric material.

7. The head according to claim 1, wherein the actuator (5) is removably associated with the dispensing unit (2), to allow the replacement of the dispensing unit (2) with another dispensing unit (2).

* * * * *